(12) United States Patent
Twig et al.

(10) Patent No.: US 8,626,476 B2
(45) Date of Patent: Jan. 7, 2014

(54) DETERMINING THE IMPACT OF ELEMENTS IN A TECHNOLOGY SYSTEM

(75) Inventors: Yuval Twig, Yehud (IL); Guy Feigenblat, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 12/872,032

(22) Filed: Aug. 31, 2010

(65) Prior Publication Data

US 2012/0053922 A1    Mar. 1, 2012

(51) Int. Cl.
*G06G 7/48*    (2006.01)

(52) U.S. Cl.
USPC ............................................................ 703/6

(58) Field of Classification Search
USPC .......................................... 703/6, 13, 20, 21
See application file for complete search history.

(56) References Cited

U.S. PATENT DOCUMENTS

| | | | |
|---|---|---|---|
| 7,006,947 B2 * | 2/2006 | Tryon et al. ................... | 702/183 |
| 7,451,063 B2 * | 11/2008 | Nelson ........................... | 702/183 |
| 7,593,859 B1 * | 9/2009 | Owens et al. ................. | 705/7.28 |
| 7,600,007 B1 * | 10/2009 | Lewis ............................ | 709/223 |
| 8,019,554 B2 * | 9/2011 | Conway et al. .................. | 702/19 |
| 2007/0094204 A1 | 4/2007 | Huelsman et al. | |
| 2008/0319777 A1 | 12/2008 | Hoff | |

OTHER PUBLICATIONS

Wan, Steward H.C. et al; "Adoption of Business Continuity Planning Processes in IT Service Management"; http://repository.lib.polyu.edu.hk/jspui/bitstream/10397/1500/1/Business%20continuity%20planning%20processes_08.pdf; 2008; p. 21-30.
Bartolini, Claudio et ai; "Business Driven Prioritization of Service Incidents"; http://www.hpl.hp.com/techreports/2004/HPL-2004-158.pdf; Nov. 15-17, 2004.
"BMC Event and Impact Management", http://www.xlr8-technologies.com/CMS/admin/Assets/rightstarsystems/assets, 2009.
"Business Services Management", http://www.quest.com/Quest_Site_Assets/PDF/BSM_DS.pdf; Aug. 30, 2007.

* cited by examiner

*Primary Examiner* — Thai Phan
*Assistant Examiner* — Herng-Der Day
(74) *Attorney, Agent, or Firm* — Sarah E. Burrows (57) ABSTRACT

Embodiments disclosed herein relate to determining the impact of elements in a technology system. A processor may receive relationship information and metrics information related to the elements in the technology system. The processor may also receive information about types of metrics. The processor may determine the impact of elements in the technology system based on the metrics information related to the types of metrics and the relationship information.

10 Claims, 7 Drawing Sheets

DETERMINING THE IMPACT OF ELEMENTS IN A TECHNOLOGY SYSTEM

BACKGROUND

An information technology system may have many different components. In some cases, the relative importance of the different components may be measured, for example, to determine how to allocate resources. Determining the value of the components may involve comparing many different components.

BRIEF DESCRIPTION OF THE DRAWINGS

In the accompanying drawings, like numerals refer to like components or blocks. The drawings describe example embodiments. The following detailed description references the drawings, wherein.

DETAILED DESCRIPTION

An information technology system may include many different elements, such as service level agreements, hardware, and software applications. In some cases, it may be helpful to evaluate the relative impact of the elements to the technology system. For example, the impact of the elements may be used to determine how to spend resources or how to prioritize responses to events. In a technology system with many components, it may be a cumbersome process to determine the relative importance of the components. A manual process may be time consuming. An automated process may be faster than a manual process, but in some cases an automated process may not provide a user with enough control over the analysis.

In one embodiment, a system automatically determines the impact of each element in a technology system based on selected types of metrics. For example, a user may select a subset of available metrics for use in determining the impact of elements in a technology system. The selected metrics may include, for example, information about the performance of an element or how close an agreement is to breach. In some implementations, a user may also enter additional information about the relative importance of selected metrics or how metrics are to be adjusted prior to determining the impact of an element. Allowing a user to select which metrics to use to determine the impact of elements provides user control over an automated process.

The selected metrics may be related to relationships between elements in the system. For example, one of the selected metrics may be the number or type of elements related to a particular element. A selected metric may involve aggregating the value of a metric associated with a particular element and the value of the metric associated with other elements associated with the particular element. Using the relationship information may allow the metric values to better reflect the impact of an element on a system as a whole based on other elements related to a particular element.

Information related to the impact of elements in a technology system may be used for various purposes. For example, additional resources may be devoted to elements with a higher impact on the system. In one implementation, the impact of elements in a technology system is used to prioritize events. For example, events related to elements with a higher impact on the system may be addressed prior to events related to elements with a lower impact on the system. This may result in resources being used more efficiently.

Figure 1:
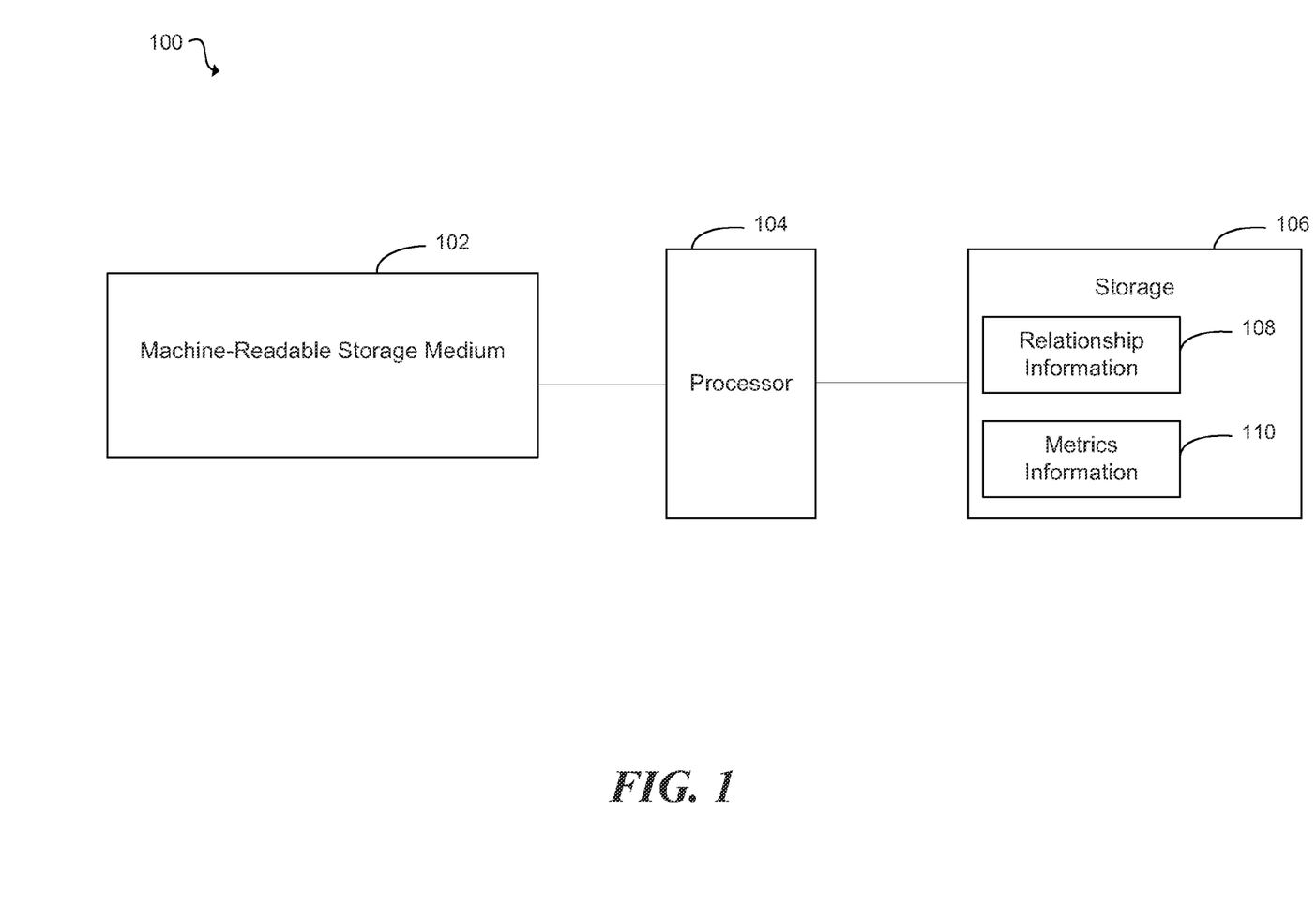
FIG. 1 is a block diagram illustrating one example of a computing system.

FIG. 1 is a block diagram illustrating one example of a computing system 100. The computing system 100 may include a machine-readable storage medium 102, a processor 104, and a storage 106. In one implementation, the machine-readable storage medium 102, the processor 104, and the storage 106 are contained in the same electronic device. In one embodiment, the computing system 100 may be used to determine the impact of elements in a technology system. The technology system may be any suitable technology system. For example, the technology system may be the information technology infrastructure of an organization. The technology system may include, for example, a legal framework of agreements associated with providing technology services.

The storage 106 may be any suitable storage, such as a volatile or non-volatile memory. The storage 106 may be included in an electronic device with the processor 104. In one embodiment, the storage 106 is a database that communicates with the processor 104 via a network. The storage 106 may store relationship information 108 and metric information 110. The storage 106 may store the relationship information 108 and the metric information 110 in any suitable manner. For example, the relationship information 108 and the metric information 110 may be stored in an Extensible Markup Language (XML) file or in a data structure, such as a graph or tree structure.

The relationship information 108 may be any suitable relationship information. The relationship information 108 may include information about relationships between elements in a technology system. The relationship information 108 may include information about how elements in a system depend on one another. For example, a service level agreement element may depend on the operation of a server element. The relationship information 108 may include information about elements being contained within one another, such as an element B that is a subset of element A, or elements that are members of the same group, such as elements C and D both as members of a server group.

The metrics information 110 may include any suitable metrics information. For example, the metrics information 110 may include information about properties of the elements in the technology system. For example, the metrics information 110 may include information about the number of users affected by an element, how important the element is to the system, or the current state of the element. In one embodiment, the types of metrics available vary based on the type of element. For example, an agreement element, such as a service level agreement, may have an associated metric for how close it is to breach.

The processor 104 may be any suitable processor. For example, the processor 104 may be one or more central processing units (CPUs), semiconductor-based microprocessors, and/or other devices suitable for retrieval and execution of instructions stored in machine-readable storage medium 102. The processor 104 may fetch, decode, and execute instructions stored in the machine-readable storage medium 102 to implement the functionality described in detail below. As an alternative or in addition to fetching, decoding, and executing instructions, the processor 104 may include one or more integrated circuits (ICs) or other electronic circuits that comprise a plurality of electronic components for performing the functionality described below.

The machine-readable storage medium 102 may be any electronic, magnetic, optical, or other physical storage device that stores executable instructions or other data (e.g., a hard disk drive, random access memory, flash memory, etc.). In one embodiment, the machine-readable storage medium 102 and the storage 106 are combined in the same storage. The machine-readable storage medium 102 may include instructions executable by the processor 104, for example, instructions to access relationship information indicating relationships between components in a technology system, access metrics information indicating measurements related to each of the components in the technology system, and receive information indicating chosen types of metrics. The machine-readable storage medium 102 may also include instructions to determine the impact of each of the components in the technology system based on the metrics information related to the chosen types of metrics and the relationships information and output the determined the impact of each of the components.

Figure 2:
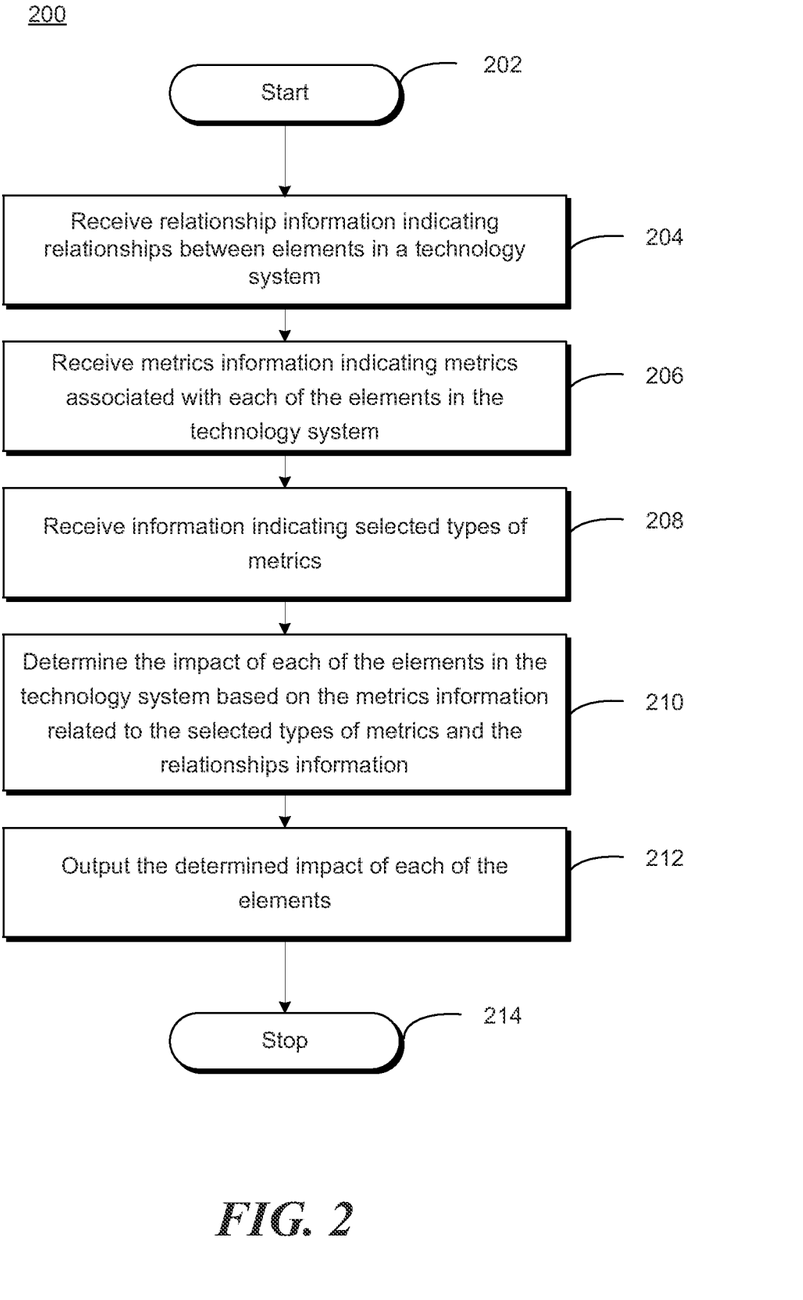
FIG. 2 is a flow chart illustrating one example of a method for determining the impact of elements in a technology system.

FIG. 2 is a flow chart illustrating one example of a method 200 for determining the impact of elements in a technology system. The processor 104 may determine the impact of components in a technology system based on the relationship information 108 and the metric information 110. The processor 104 may receive information about selected types of metrics to use for determining the impact of components and determine the impact of the components based on the metrics in the metric information 110 that are related to the selected type. For example, metrics 1, 3, and 5 may be selected for determining the impact of components in the technology system. The processor 104 may then output the determined impact information.

Beginning at block 202 and continuing to block 204, the processor 104, such as by executing instructions in the machine-readable storage medium 102, receives the relationship information 108 indicating relationships between elements in a technology system. The elements may be any suitable components of a technology system. For example, the elements may be hardware, software applications, or technology agreements. The elements may include elements within them, such as a computer element containing a hard drive element.

The relationship information 108 may be any suitable relationship information. For example, the relationship information 108 may include information about elements depending on one another, being contained within one another, or being members of the same group. In one embodiment, elements may be related to one another by more than one aspect. For example, software application element A may depend on server element B for the software application element A to execute. In addition, element A and element B may both be related to a particular service provided, such as a service element C.

The processor 104 may access the relationship information 108 in any suitable manner. For example, the processor 104 may receive the relationship information 108 from another electronic device via a network. The processor 104 may retrieve the relationship information 108 from a storage, such as the storage 106. In one implementation, the processor 104 stores received relationship information 108 in the storage 106 for later retrieval.

Figure 3:
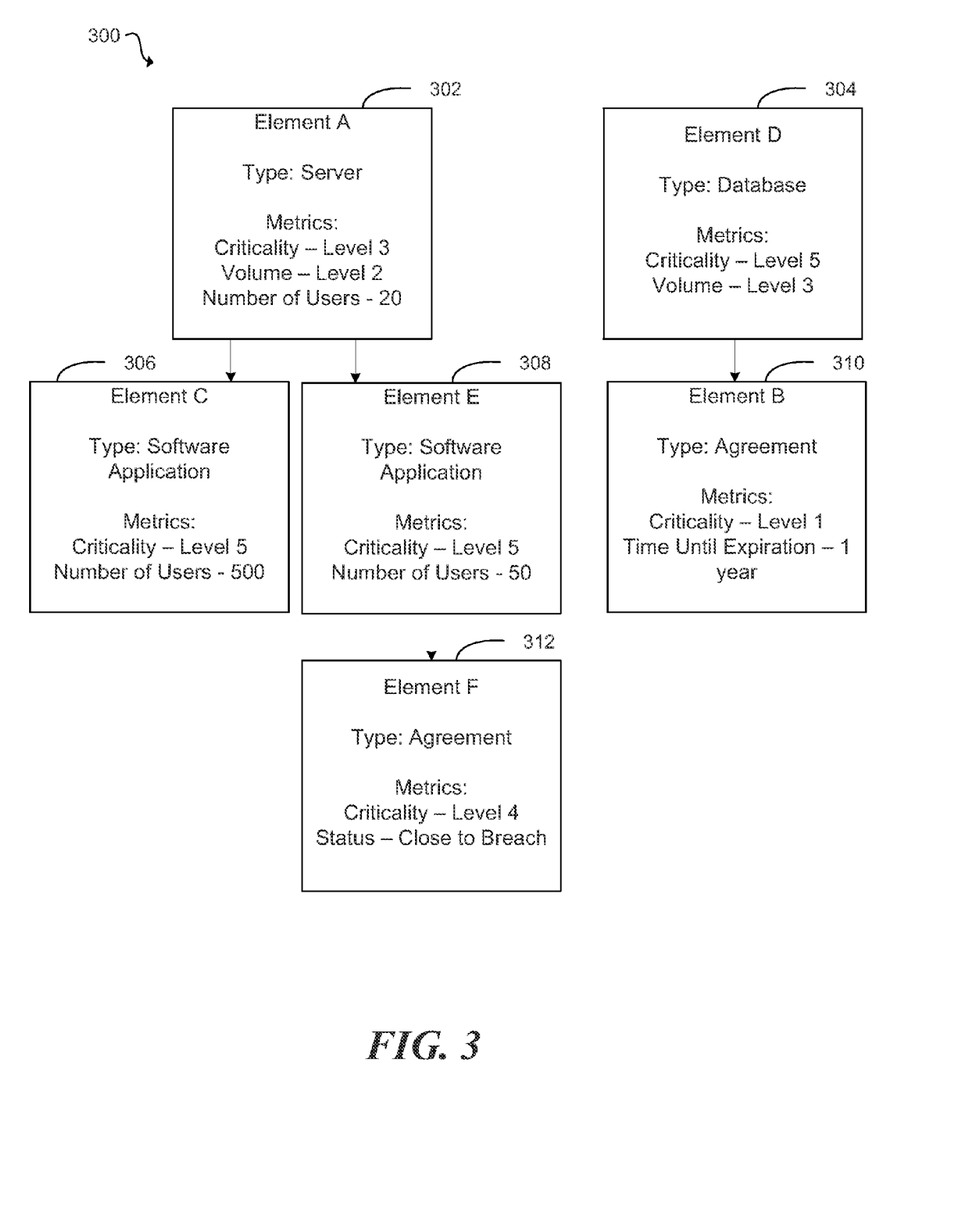
FIG. 3 is a block diagram illustrating one example of elements in a technology system.

FIG. 3 is a block diagram illustrating one example of elements in a technology system 300. FIG. 3 is discussed in relation to the steps shown in FIG. 2. The technology system 300 includes elements A-F. FIG. 3 shows the dependency between the elements. For example, element A shown in block 302 is a server, and software application element C shown in block 306, software application element E shown in block 308, and agreement element F shown in block 312 depend on the element A server. For example, the software application element C and the software application element E may run on the server element A. Element C is a software application with no elements depending on it, and element E is a software application with agreement element F depending on it. The agreement element F may be related to the running of the software element E on the server element A. Element D shown in block 304 is a database, and agreement element B shown in block 310 depends on it. For example, the agreement element B may be related to an agreement to store data or access data from the database element D.

Referring back to FIG. 2, proceeding to block 206, the processor 104, such as by executing instructions in the machine-readable storage medium 102, receives the metrics information 110 indicating metrics associated with each of the elements in the technology system. The metrics information 110 may be associated with any suitable unit. For example, statuses may have multiple levels, such as (1) acceptable, (2) warning, (3) minor, (4) major, and (5) critical. In some implementations, each element has multiple metrics associated with it. For example, there may be multiple types of metrics, and multiple types of metrics may be associated with an element. In some implementations, the processor 104 receives information related to new metrics. For example, a user may create a new metric and upload the information related to the metric associated with the elements in a technology system.

The metrics information 110 may include any suitable metrics information. Example metrics are discussed, but others are also contemplated. The metrics information 110 may include information related to a qualitative measure of the importance of an element, such as a measure of how critical it is to the technology system. The metrics information 110 may be related to the status of an element, such as whether an element is unavailable, the length of time the element has been unavailable, or the length of time the element is likely to be unavailable. For example, the metrics information 110 may include information about a server being down for the past four hours. The metrics information 110 may include information about the performance of an element, such as a key performance indicator associated with an element. For example, the metrics information 110 may indicate that a server is running slower or that there is a particular wait time for a response from a server element.

The metrics information 110 may include information about users or services affected by the element. For example, the metrics information 110 may include information about the number of users affected by an element, such as the number of people likely to use a software application element. The metrics information 110 may include information about the number of users who have used an element in the past.

The metrics information 110 may include information about obligations or agreements related to the technology system. For example, the metrics information 110 may include information about when an agreement element, such as a service level agreement, would be breached. For example, the metric may indicate that an agreement would be breached if a service is not provided by a particular date.

The processor 104 may access the metrics information 110 in any suitable manner. For example, the processor 104 may receive the metrics information 110 via a network. The processor 104 may receive the metrics information 110 from the storage 106. The processor 104 may receive the metrics information 110 and store it in the storage 106 for later retrieval and use. The processor 104 may receive the metrics information 110 from user input. In some implementations, the processor 104 performs procedures to determine the metrics. For example, the processor 104 may communicate with a server and time its response where the response time is a metric associated with the server element.

Referring to FIG. 3, FIG. 3 shows the metrics information 110 associated with each of the elements. Each element may have different metrics associated with it. The metrics may be measured in any suitable units. For example, the metrics may have 5 levels, such as where an element with a criticality level of 3 is less critical to the technology system 300 than an element with a criticality level of 5. Metrics associated with the element A shown in block 302 include a criticality level 3, a volume level 2, and 20 users. The volume level 2 may indicate that the volume of use of the server element A is relatively low. Element D shown in block 304 has a criticality level 5 and a volume level 3. Element C shown in block 306 has a criticality level 5 and 500 users, and element E shown in block 308 has a criticality level 5 and 50 users. Element B shown in block 310 has a criticality level 1 and 1 year until expiration of the agreement. Element F shown in block 312 has a criticality level 4 and a status that the agreement is close to breach.

Referring back to FIG. 2, moving to block 208, the processor 104, such as by executing instructions in the machine-readable storage medium 102, receives information indicating selected types of metrics. For example, a user may indicate that the impact of elements in a technology system should be determined using a subset of the metrics information 110. Such an implementation may provide a user more control over how the impact of elements is determined. In some cases, a user may want the impact determined based on metrics that the user considers to be more important or that are more applicable in a particular context.

The information indicating chosen types of metrics may be any suitable type of metrics information. For example, the metrics information 110 may include information about metrics 1, 2, 3, and 4 related to elements A, B, and C. The processor 104 may receive information that metrics 1 and 3 are selected for determining the impact of elements A, B, and C. In some cases, the processor 104 receives selected metrics related to types of elements. For example, the processor 104 may receive information selecting metrics 1 and 3 for websites and metrics 2 and 3 for agreements.

The processor 104 may access the information indicating selected types of metrics in any suitable manner. For example, the processor 104 may receive the information from an end user, such as from an input device connect to an electronic device containing the processor 104 or from another electronic device via a network. In one embodiment, the processor 104 or another processor generates a user interface for receiving a selection of types of metrics. The processor 104 may receive the information indicating the selected types of metrics from a storage, such as the storage 106. The processor 104 may store the received information related to the selected types of metrics for later retrieval and use.

Continuing to block 210, the processor 104, such as by executing instructions in the machine-readable storage medium 102, determines the impact of each of the elements in the technology system based on the metrics information 110 related to the selected types of metrics and the relationships information 108. The processor 104 may determine an impact for each of the elements in any suitable manner.

In some implementations, the relationship information 108 is used to determine an impact for the elements. To determine the impact of an element based on a metric, the metric information associated with the particular element and the metric information associated with elements related to the particular element may be used. For example, a performance metric may be based on the performance of a first element, the average performance of the first element along with the performance of the elements related to the first element, or the lowest or highest performance among the first element and the elements related to it. In some implementations, the processor 104 receives user input related to how to calculate a metric for an element, such as whether an average should be calculated.

In some cases, the relationship information 108 may be related to a selected type of metric. For example, a selected type of metric may be the number of elements related to each element. An element with more items related to it may be considered to have a higher impact than an element with fewer elements related to it.

In some implementations, the metrics information 110 is associated with a level. For example, a criticality metric may have a level between 1 and 5, and a performance element may have a level between 1 and 10. In some implementations, a metric is assigned a percentage based on the level. For example, a level 2 out of 5 may be assigned a level of 2/5, or 40%. In some implementations, a numerical level is associated with a qualitative measure. For example, 1 may correspond to acceptable, 2 to warning, 3 to minor, 4 to major, and 5 to critical.

The processor 104 may combine information about multiple types of metrics related to an element in any suitable manner. The processor 104 may aggregate the metrics, such as by averaging. For example, information about a performance metric associated with element A may be averaged with information about a criticality metric associated with element A.

In some implementations, a numerical impact score is converted into an impact level. A numerical impact value may be used to organize elements in to groups based on impact levels. For example, a level 5 may correspond to high, level 4 to medium-high, level 3 to medium, level 2 to medium-low, level 1 to low, and level 0 to none.

Figure 4:
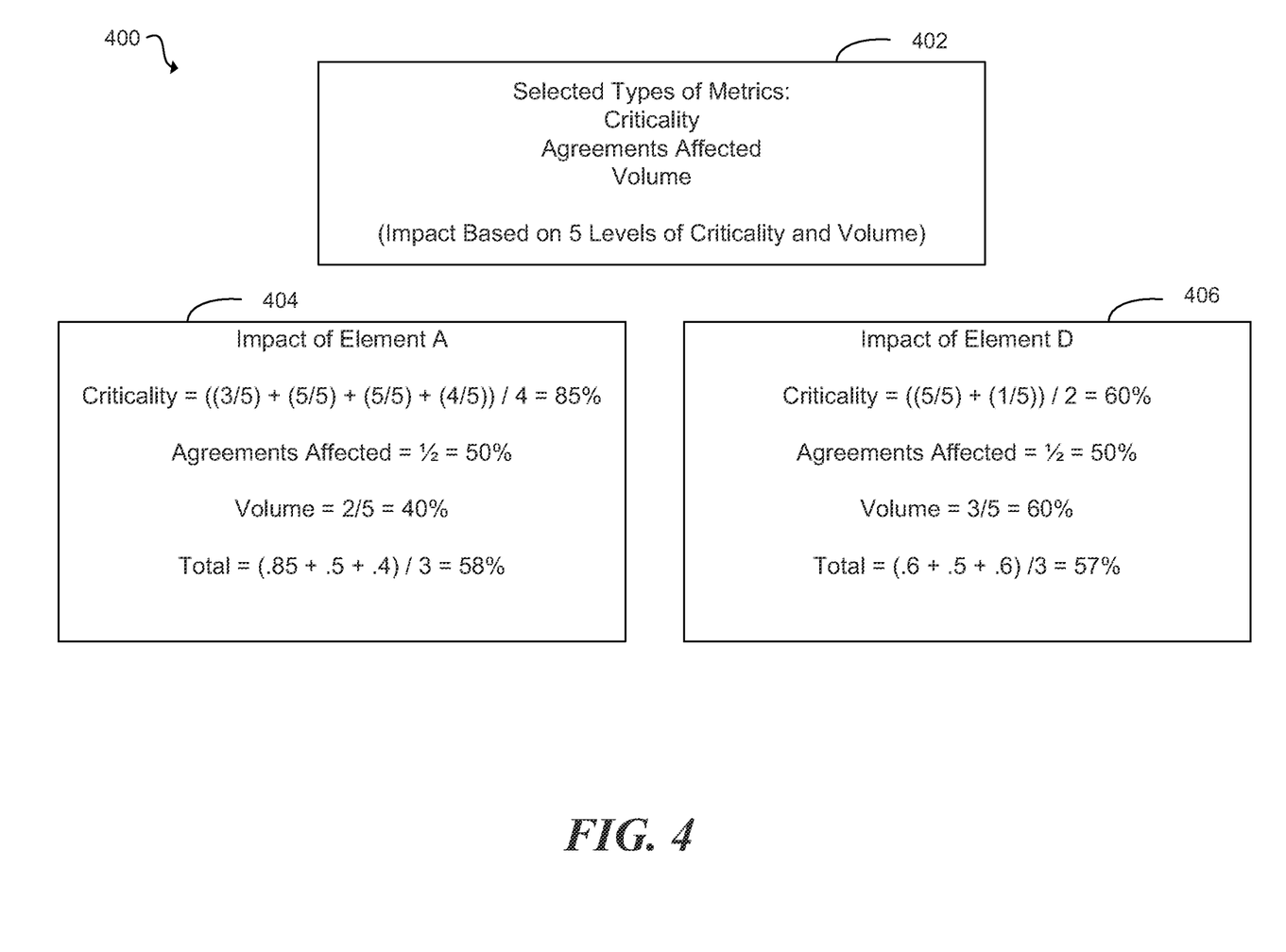
FIG. 4 is a block diagram illustrating one example of determining the impact of elements in a technology system.

FIG. 4 is a block diagram illustrating one example 400 of determining the impact of elements in the technology system 300 shown in FIG. 3. Block 402 shows the selected types of metrics as criticality, number of agreements affected, and volume where there are five levels of criticality and volume. Block 404 shows the determination of the impact of server element A shown in block 302 of FIG. 3. The criticality is determined based on the average criticality of element A along with the elements that depend on it, elements C, E, and F. Because there are five levels, each level of criticality is divided by 5. The criticality is the average of 3/5 corresponding to the criticality of element A, 5/5 corresponding to the criticality of element C, 5/5 corresponding to the criticality of element E, and 4/5 corresponding to the criticality of element F. The resulting criticality for element A is 85%. The agreements affected by element A is 50% because one of the two agreements, agreement element F, depends on element A. The volume metric associated with element A is 40% because it has a level 2 out of 5. The three metrics are then averaged to reach element As impact score of 58%. In some cases, an impact score may be translated into an impact level. For example, a score of between 40% and 60% may correspond to a medium impact.

Block 406 shows the determination of the impact for database element D shown in block 304 of FIG. 3. The criticality of element D is based on the criticality level of element D and of agreement element B that depends on element D. The resulting criticality level is 60%. The agreements affected by element D is ½ because 1 of the 2 agreements, agreement element B, depends on element D. The volume level for element D is 3 out of 5, or 60%. The total impact of element D is determined by averaging the three metrics, resulting in a total impact of 57%. The impact of element D is slightly lower than the impact of element A.

In some implementations, the received metrics information related to the indicated types of metrics is adjusted prior to determining the impact of the elements. In some implementations, more than one type of metric is adjusted prior to determining the impact of the elements. The metrics adjustment information may be received in any suitable manner, such as from a storage. The adjustment information may be used to smooth the metrics values. For example, a user may not want an exact number of element relationships used for a number of relationships metric. A user may want elements with more than ten relationships to be considered important and thus assigned a 1 for the metric value and elements with less than ten relationships to be considered unimportant and thus assigned a 0 for the metric value. In one implementation, the elements may be compared based on the percentage of the elements that depend on them. For example, if a first element has 3 of the 10 elements depending on it, the first element may be assigned a score of 30%, and if a second element has 8 elements depending on it, the second element may be assigned a score of 80%.

Figure 5:
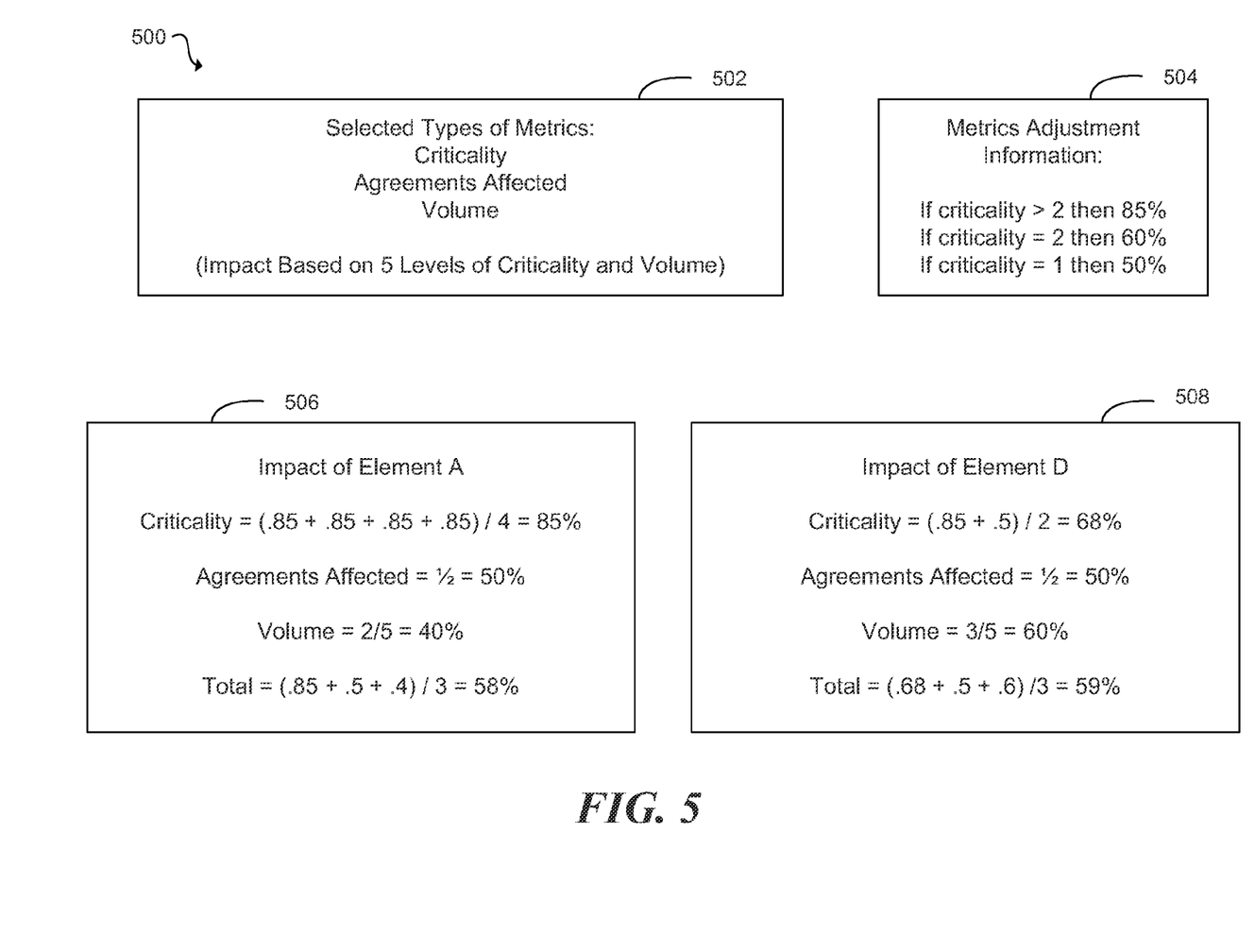
FIG. 5 is a block diagram illustrating one example of determining the impact of elements in a technology system.

FIG. 5 is a block diagram illustrating one example of determining the impact of elements in the technology system 300 shown in FIG. 3. Block 502 shows the same selected types of metrics as in block 402 of FIG. 4. Block 504 shows metrics adjustment information. For example, a criticality level of greater than 2 is given a value of 85%, a criticality level of 2 is given a value of 60%, and a criticality level of 1 is given a value of 50%.

The provided criticality scores are used to determine the criticality of element A shown in block 302 of FIG. 3 and element D shown in block 304 of FIG. 3. Block 506 shows the determination of the impact of element A. The criticality of element A and each of its dependent elements is above a level 2. As a result, each of the criticality levels is assigned a score of 85%. The calculation for the agreements affected and the volume remains the same as in block 404 of FIG. 4. The total impact for element A is determined based on averaging the updated criticality, the affected agreements, and the volume, resulting in a 58% impact.

The determination of the impact of element D is shown in block 508. The criticality for element D is assigned the value 85% because the criticality level is above 2, and the criticality level of the agreement element B depending on element D is assigned the value 50% because of its critically level 1. The total impact of element D is determined using the updated criticality level. The resulting impact is 59%. Using the metrics adjustment information from block 504, the impact of element D is greater than the impact of element A. The relative impact of element A and element D was altered by using the adjustment information.

In some implementations, weights associated with selected metrics are received, such as from a user or from a storage. In some implementation, the selected metrics and associated weights are received from a file, such as an Extensible Markup Language (XML) file. As an example, a zero weight may indicate that a metric type is not to be considered. In some implementations, the weights are percentage values totaling one hundred percent that are assigned to each metric. For example, a first metric may be 60% of the impact calculation and a second metric may be 40% of the impact calculation. In some cases, the selected metric types are ranked in order of importance rather than being assigned numerical weight values.

Figure 6:
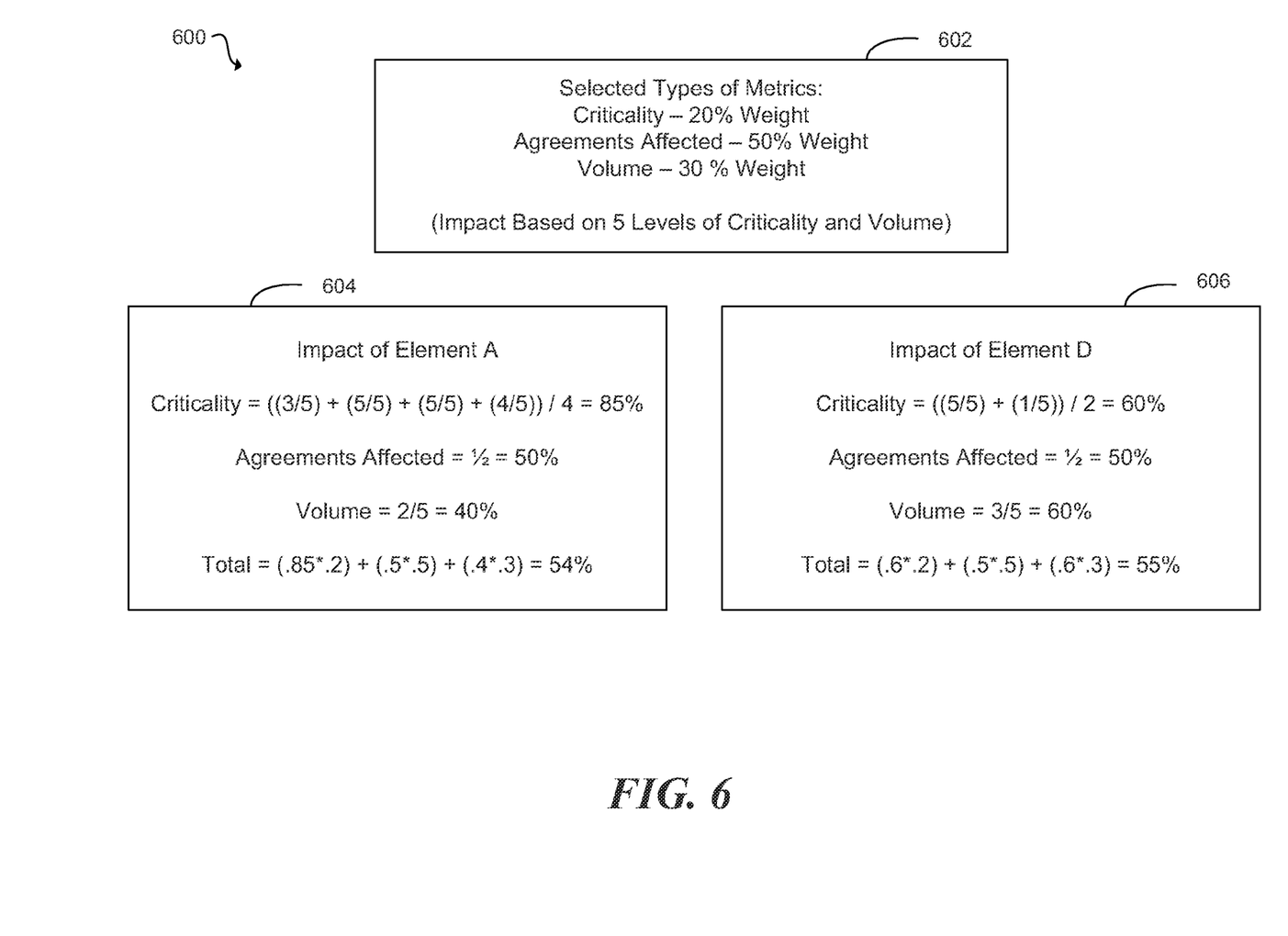
FIG. 6 is a block diagram illustrating one example of determining the impact of elements in a technology system.

FIG. 6 is a block diagram illustrating one example of determining the impact of elements in the technology system 300 shown in FIG. 3. Block 602 shows the selected metrics from FIGS. 4 and 5 with weights associated with them. For example, the selected criticality metric has a 20% weight associated with it, meaning that the criticality metric should account for 20% of the impact of an element. The affected agreements metric has a 50% weight associated with it, and the volume metric has a 30% weight associated with it.

Block 604 shows the determination of the impact of element A from block 302 of FIG. 3. The determination of the criticality, affected agreements, and volume are the same as in FIG. 4 block 404. The total impact is determined by multiplying the criticality by 0.2, the affected agreements metric by 0.5 and the volume metric by 0.3 to reflect the weights associated with the metrics. The resulting impact is 54%.

Block 606 shows the determination of the impact of element D from block 304 of FIG. 3. The determination of the criticality, affected agreements, and volume are the same as in FIG. 4 block 406. The impact for element D is determined by multiplying the criticality by 0.2, the affected agreements metric by 0.5, and the volume metric by 0.3. Element D has an impact of 55% using the metric weights.

Referring back to FIG. 2, moving to block 212, the processor 104, such as by executing instructions in the machine-readable storage medium 102, outputs the determined impact of each of the elements. The processor 104 may output the determined impact to a storage, such as the storage 106. In some implementations, the processor 104 stores the determined impact information in a remote storage via a network. The processor 104 may display the determined impact information. For example, the processor 104 may format the information for display by the processor 104 or by another processor. The processor 104 may send the determined impact information to another electronic device. For example, the processor 104 may send the information via a network. The method continues to block 214 and ends.

Impact information related to elements in a technology system may be used for a variety of purposes. In some cases, determined impact information related to elements of a technology system may be used to prioritize events, such as prioritizing which hardware to upgrade or which incident to troubleshoot. For example, a processor may receive information about events, such as from a storage or another electronic device, and elements related to each event. The processor may then prioritize the events based on the determined impact of the elements related to each event. For example, events related to elements with a higher determined impact may be prioritized over events related to elements with a lower determined impact. The aggregate impact of multiple elements related to an event may be determined in any suitable manner.

Figure 7:
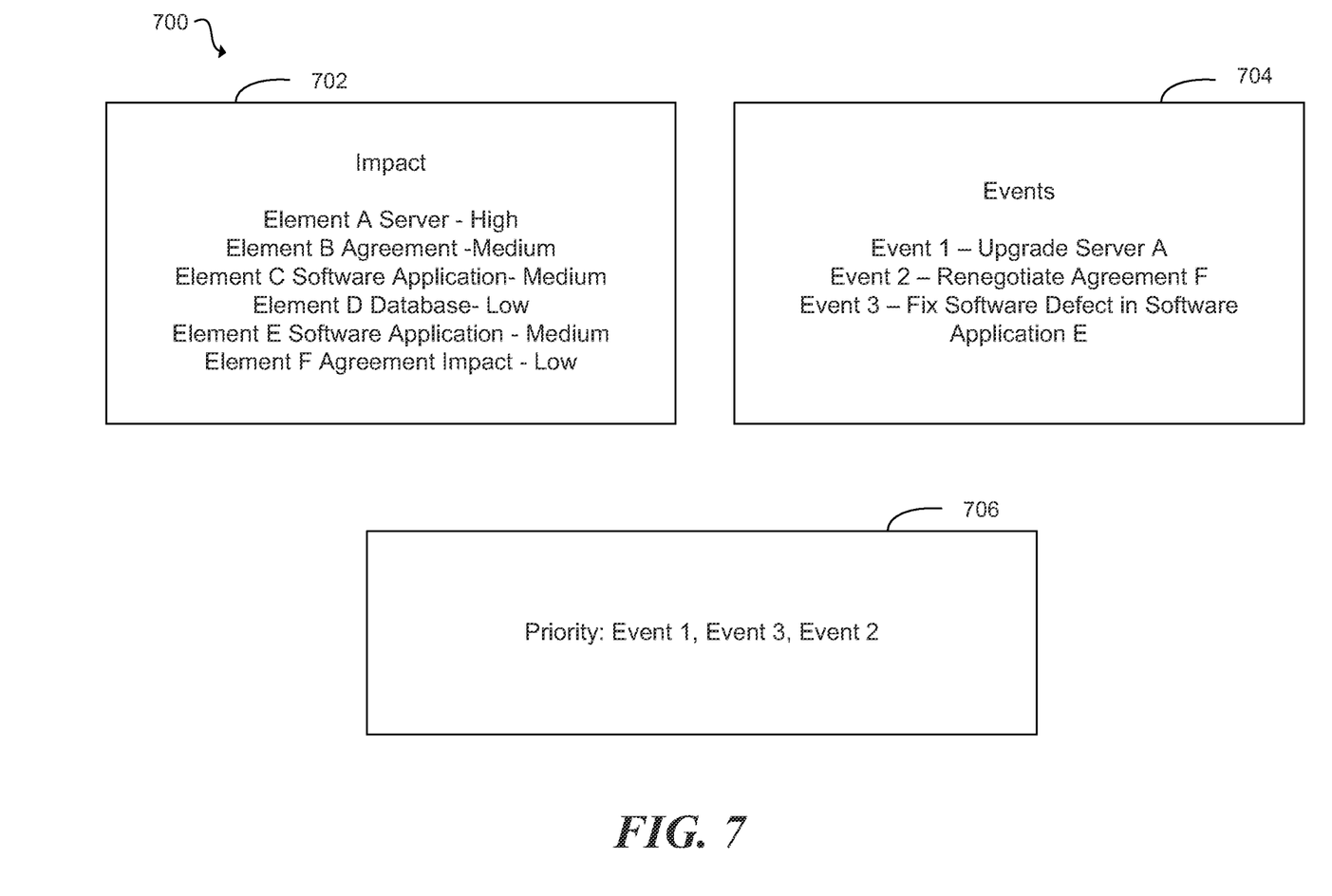
FIG. 7 is a block diagram illustrating one example of prioritizing events associated with a technology system.

FIG. 7 is a block diagram illustrating one example of prioritizing events associated with a technology system. For example, block 702 shows an impact level associated with each of the elements from FIG. 3. Block 704 shows a list of events where each events is associated with one of the elements. For example, event 1 is associated with server element A which has a high impact, event 2 is associated with agreement element F which has a low impact, and event 3 is associated with software application E which has a medium impact. Block 706 shows the events prioritized in the order of event 1, event 3, and event 2 such that event 1 associated with an element with a higher impact has a higher priority.

Determining the impact of elements in a technology system based on user selected metrics provides a user control over the impact determination process, but maintains an automated aspect as well. The use of relationship information for determining the impact of elements allows for the impact information to reflect the impact of an element based on metrics associated with elements related to the element being measured. Practical uses of such a system include the ability to prioritize events, such as maintenance, incidence response, or allocating future resources.

The invention claimed is:

1. A computing system, comprising:
   a storage for storing:
      relationship information indicating relationships between elements in a technology system; and
      metrics information indicating metrics associated with a first one of the elements in the technology system and metrics associated with a number of additional elements related to the first element, wherein the elements include service level agreements and the metrics include how close the service level agreements are to breach; and
   a processor for:
      accessing the relationship information from the storage;
      receiving a list of the metrics associated with the first element and the metrics associated with the number of additional elements related to the first element;
      accessing the metrics information from the storage related to the metrics in the received list;
      determining an impact of the first element in the technology system based on the accessed relationship information and the accessed metrics information;
      receiving information about an event associated with the first element; and
      prioritizing the event relative to an additional event associated with one of the additional elements based at least on the determined impact of the first element.

2. The computing system of claim 1, wherein one of the metrics comprises a qualitative measure of an importance of an element.

3. The computing system of claim 1, wherein the processor further receives a weight associated with at least one of the metrics in the received list, and
   wherein determining the impact comprises determining the impact based on the received weight.

4. A method, comprising:
   receiving, by a processor, relationship information indicating relationships between elements in a technology system;
   receiving, by the processor, metrics information indicating metrics associated with a first one of the elements in the technology system and metrics associated with a number of additional elements related to the first element, wherein the elements include service level agreements and the metrics include how close the service level agreements are to breach;
   determining, by the processor, an impact of the first element in the technology system based on the received metrics information and the received relationship information;
   receiving, by the processor, information about an event associated with the first element; and
   prioritizing, by the processor, the event relative to an additional event associated with one of the additional elements based at least on the determined impact of the first element.

5. The method of claim 4, wherein one of the metrics comprises a measure of a performance of an element.

6. The method of claim 4, further comprising adjusting, by the processor, the received metrics information, wherein determining the impact of the first element comprises determining the impact of the first element based on the adjusted metrics information.

7. The method of claim 4, further comprising:
   receiving, by the processor, a weight associated with at least one of the metrics,
   wherein determining the impact comprises determining the impact based on the received weight.

8. A machine-readable non-transitory storage medium encoded with instructions executable by a processor comprising instructions to:
   access relationship information indicating relationships between components in a technology system;
   access metrics information indicating measurements related to a first one of the components in the technology system and measurements related to a number of additional components related to the first component, wherein the components include service level agreements and the measurements include how close the service level agreements are to breach;
   determine an impact of the first component in the technology system based on the accessed metrics information and the received relationship information;
   receive information about an event associated with the first component; and
   rank the event relative to an additional event associated with one of the additional components based at least on the determined impact of the first component.

9. The machine-readable non-transitory storage medium of claim 8, further comprising instructions to adjust the accessed metrics information,
   wherein determining the impact of the component comprises determining the impact of the first component based on the adjusted metrics information.

10. The machine-readable non-transitory storage medium of claim 8, further comprising instructions to receive a weight associated with at least one of the metrics,
    wherein instructions to determine the impact comprise instructions to determine the impact based on the received weight.

* * * * *